(12) United States Patent
Kannan

(10) Patent No.: US 8,875,681 B2
(45) Date of Patent: Nov. 4, 2014

(54) FUEL RAIL MOUNTING ARRANGEMENT

(75) Inventor: Venkatesh Kannan, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 588 days.

(21) Appl. No.: 13/284,271

(22) Filed: Oct. 28, 2011

(65) Prior Publication Data

US 2013/0104852 A1 May 2, 2013

(51) Int. Cl.
| | |
|---|---|
| *F02M 69/46* | (2006.01) |
| *F02M 55/02* | (2006.01) |
| *F02M 61/16* | (2006.01) |
| *F16F 1/41* | (2006.01) |
| *F16F 1/374* | (2006.01) |
| *F16F 1/373* | (2006.01) |

(52) U.S. Cl.
CPC ....... *F02M 61/168* (2013.01); *F02M 2200/855* (2013.01); *F02M 2200/9015* (2013.01); *F02M 2200/857* (2013.01); *F02M 2200/9046* (2013.01); *F16F 1/41* (2013.01); *F16F 1/374* (2013.01); *F16F 1/3735* (2013.01)
USPC .......................................................... 123/456

(58) Field of Classification Search
USPC .......................................... 123/456, 468–470
See application file for complete search history.

(56) References Cited

U.S. PATENT DOCUMENTS

| | | | |
|---|---|---|---|
| 2,460,829 A | 2/1949 | Ivanovie | |
| 3,756,551 A | 9/1973 | Bishop | |
| 5,044,338 A * | 9/1991 | Shelton | 123/456 |
| 5,743,509 A | 4/1998 | Kanda et al. | |
| 7,249,756 B1 | 7/2007 | Wilke et al. | |
| 7,334,571 B1 | 2/2008 | Beardmore | |
| 7,406,946 B1 | 8/2008 | Watanabe et al. | |
| 7,516,735 B1 | 4/2009 | Doherty et al. | |
| 7,591,246 B2 | 9/2009 | Beardmore et al. | |
| 7,793,639 B2 | 9/2010 | Hunt et al. | |
| 2009/0235898 A1 | 9/2009 | Short | |
| 2011/0073074 A1 | 3/2011 | Hay et al. | |
| 2014/0026401 A1 * | 1/2014 | Solferino et al. | 29/700 |

FOREIGN PATENT DOCUMENTS

| | | |
|---|---|---|
| DE | 3919775 | 10/1990 |
| DE | 4421878 | 1/1996 |
| GB | 2204935 | 11/1988 |
| WO | 91/11607 | 8/1991 |
| WO | 2009/129520 | 10/2009 |
| WO | 2010/101693 | 9/2010 |

OTHER PUBLICATIONS

International Search Report and Written Opinion for Application No. PCT/US2012/062523 dated Apr. 18, 2013 (14 pages).

(Continued)

*Primary Examiner* — Hieu T Vo

(74) *Attorney, Agent, or Firm* — Michael Best & Friedrich LLP

(57) ABSTRACT

A fuel rail has a mounting portion with an aperture through which a fastener extends along a central axis. The fastener secures the fuel rail with respect to a support surface. Stacked-layer isolators are positioned on both sides of the mounting portion. Each stacked-layer isolator includes a pair of rings and an elastomer layer positioned between the rings. Each elastomer layer has a pair of opposing contact surfaces respectively contacting adjacent contact surfaces of the corresponding pair of rings. The pairs of opposing contact surfaces of the elastomer layers and the contact surfaces of the pairs of rings are oblique to the central axis.

12 Claims, 3 Drawing Sheets

(56) References Cited

OTHER PUBLICATIONS

Office Action dated Dec. 6, 2013 from the United States Patent and Trademark Office for U.S. Appl. No. 13/300,165, 23 pages.

International Search Report and Written Opinion for Application No. PCT/US2012/062523 dated Feb. 18, 2013 (12 pages).
International Search Report and Written Opinion for Application No. PCT/US2012/062143 dated Feb. 18, 2013 (10 pages).

* cited by examiner

FUEL RAIL MOUNTING ARRANGEMENT

BACKGROUND

The present invention relates to structures for reducing noise due to vibration in fuel rails. For example, applications such as direct injection engines having high pressure fuel injectors mounted directly in a cylinder head of the engine create substantial noise under certain conditions unless specific countermeasures are taken.

Known isolation mounts for high pressure fuel rails provide a reduction in unwanted fuel system noise, but generally rely on simple compression of an elastomeric material. Although mounts with compression limiters have been developed that allow a bolt of the mount to be tightened beyond the compressive preload amount applied to the elastomeric material, damping capabilities are generally limited, and the compressed elastomeric material will inherently suffer from compression reduction as the elastomeric material ages.

SUMMARY

In one aspect, the invention provides a fuel rail mounting arrangement. A fuel rail has a mounting portion with an aperture. A fastener extends through the aperture along a central axis and has a first end and an opposed second end. The fastener is configured to secure the fuel rail with respect to a support surface. A first stacked-layer isolator is positioned on a first side of the mounting portion, compressed between the first end of the fastener and the mounting portion of the fuel rail by tightening of the fastener. A second stacked-layer isolator is positioned on a second side of the mounting portion, compressed between the mounting portion of the fuel rail and the support surface by tightening of the fastener. Each stacked-layer isolator includes a pair of rings and an elastomer layer positioned between the rings. Each elastomer layer has a pair of opposing contact surfaces respectively contacting adjacent contact surfaces of the corresponding pair of rings. The pairs of opposing contact surfaces of the elastomer layers and the contact surfaces of the pairs of rings are oriented oblique to the central axis.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
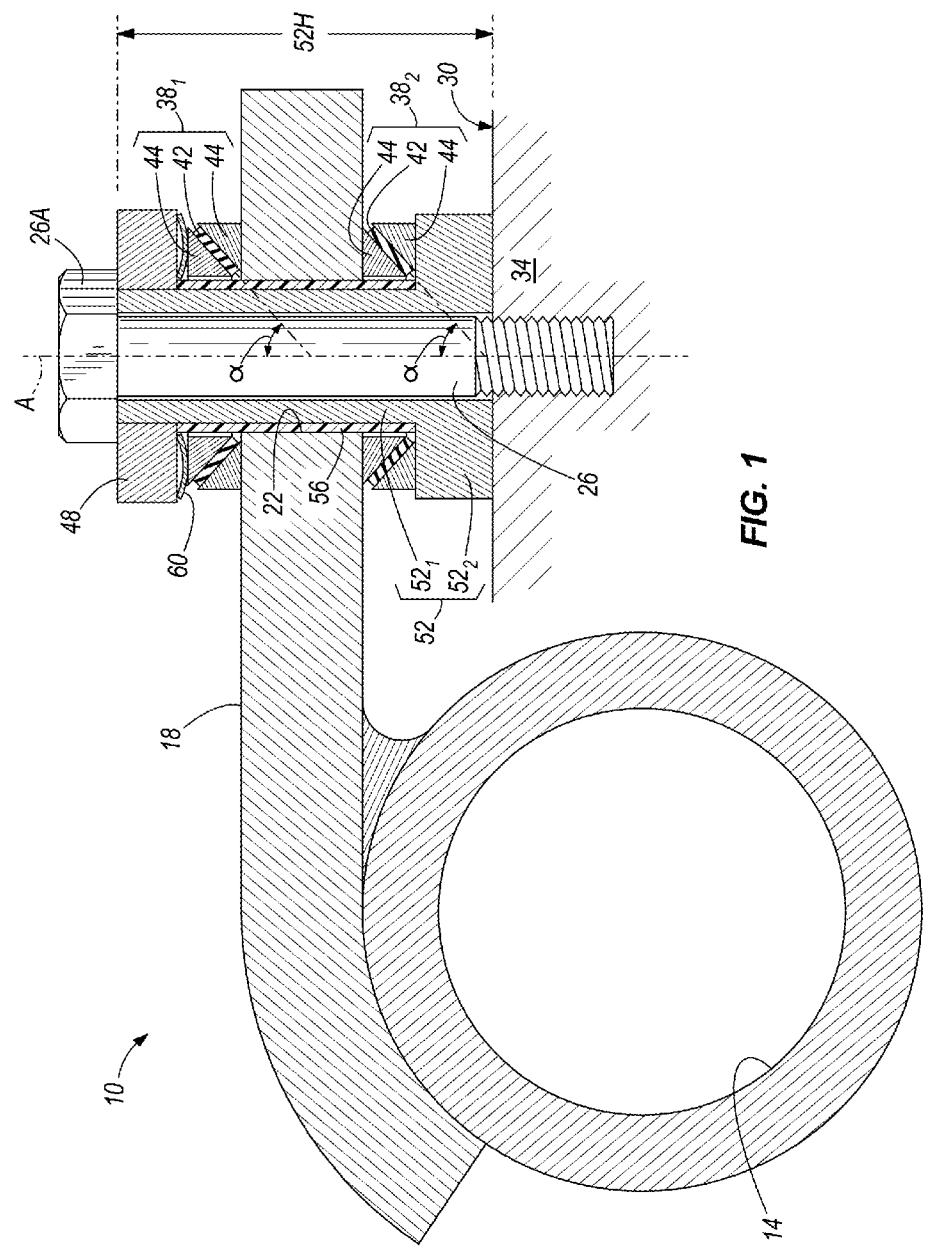
FIG. 1 is a cross-sectional view of a first construction of a vibration isolation fuel rail mounting arrangement, or mount.

FIG. 1 illustrates a fuel rail 10 having an internal passage 14 for conveying fuel from a fuel source (e.g., a fuel pump pumping fuel from a storage tank) to an internal combustion engine. A plurality of fuel injectors (not shown) are coupled to the fuel rail 10 to receive fuel from the fuel source and inject a metered quantity of fuel into the engine for combustion. The fuel rail 10 includes a mounting portion (e.g., a plurality of mounting bosses 18, one of which is shown in FIG. 1). The mounting boss 18 includes a mounting aperture 22. A fastener, which can be a bolt 26 or other threaded fastener for example, extends through the aperture 22 along a central axis A and engages a support surface 30. In this way, the bolt 26 secures the fuel rail 10 with respect to the support surface 30, although other fastener types and means for securing the fuel rail 10 may be employed. In some constructions, where the fuel rail 10 is part of a direct injection fuel system that injects fuel directly into a combustion chamber, the support surface 30 is provided by a cylinder head 34 of the engine. The cylinder head 34 can include any known configuration of intake and exhaust passages and corresponding intake and exhaust valves, and can at least partially define the combustion chamber.

During operation of the engine, particularly a direct injection engine where fuel injection pressures are very high, dynamic mechanical and hydraulic forces from the injectors and the high pressure pump cause higher noise levels if not remedied appropriately. Thus, the mounting arrangement for the fuel rail 10 further includes a stacked-layer isolator 38 on each side of the mounting boss 18. As described in further detail below, the stacked-layer isolators 38 are constrained-layer type isolators that operate to take advantage of in-plane shear damping of an elastomeric damping layer 42 to attenuate noise and vibration caused by the injector and hydraulic pulsations in the fuel rail 10. Each stacked-layer isolator 38 includes at least two blocks or rings 44 separated by an interposed elastomer layer 42. A first one of the stacked-layer isolators $38_1$ is positioned on a first side of the mounting boss 18 that is remote from the support surface 30. The first stacked-layer isolator $38_1$ is compressed between a first end 26A (e.g., a head end) of the bolt 26 and the mounting boss 18 by tightening of the bolt 26. In the illustrated construction, a force-transmitting block or ring 48 is positioned between the first end 26A of the bolt 26 and the first stacked-layer isolator $38_1$ to provide an increased surface area for contacting the first stacked-layer isolator $38_1$, but in other constructions, the first end 26A of the bolt 26 or other fastener can apply compression to the first stacked-layer isolator $38_1$ without any force-transmitting block or ring therebetween. A second stacked-layer isolator $38_2$ is positioned on a second side of the mounting boss 18, opposite the first side and closer to the support surface 30. The second stacked-layer isolator $38_2$ is compressed between the mounting boss 18 and the support surface 30 by tightening of the bolt 26. The second stacked-layer isolator $38_2$ can contact the support surface 30 directly or indirectly.

A compression limiter 52 is positioned between the first end 26A of the bolt 26 and the support surface 30. The compression limiter 52 has an axial height 52H configured to limit the amount of axial compression applied to the elastomer layers 42 to a predetermined maximum amount. In other words, as the bolt 26 is tightened up to a predetermined torque, an initial compression of the stacked-layer isolators 38 occurs as the force-transmitting block 48 is forced down along the compression limiter 52 by the first end 26A of the bolt 26 before the compression limiter 52 becomes sandwiched between the first end 26A of the bolt 26 and the support surface 30. As the bolt 26 is further tightened from this point, the compression limiter 52 bears the full reaction force of the tensile preload in the bolt 26 while the stacked-layer isolators 38 only experience the initial preload compression, which can be fine-tuned by control of the relative heights of the components. This allows the bolt 26 to be tightened corresponding to a predetermined tensile preload required to prevent loosening during operation of the engine, without over-compressing the elastomer layers 42. As illustrated, the compression limiter 52 includes a sleeve portion $52_1$ extending along and around the bolt 26, and a shoe portion $52_2$ that is integrally formed as one piece with the sleeve portion $52_1$. The shoe portion $52_2$ is provided with an axially-facing cross-sectional area larger than an axially-facing cross-sectional area of the sleeve portion $52_1$ so that the axial preload applied by the bolt 26, which may be rather high, is less likely to dent or otherwise harm the support surface 30, which may be made of aluminum in some constructions. A buffer sleeve 56 is positioned radially between an outside of the compression limiter sleeve $52_1$ and an inside of each of the stacked-layer isolators 38 and the mounting aperture 22. The buffer sleeve 56, which may be constructed of an elastomeric material, prevents direct contact or "grounding" between the compression limiter 52 and any of the rings 44 of the stacked-layer isolators 38 or the mounting boss 18 when vibration-induced displacement among the components occurs. Contact between these metal or otherwise rigid structures, which is detrimental to noise suppression, is thus avoided.

In addition to the stacked-layer isolators 38, at least one axial spring (e.g., a disc spring 60) is positioned between the first end 26A of the bolt 26 and the support surface 30 (e.g., between the force-transmitting block 48 and the shoe portion $52_2$ of the compression limiter 52). In the construction of FIG. 1, a single disc spring 60 is positioned adjacent the first stacked-layer isolator $38_1$, between the force-transmitting block 48 and the first stacked-layer isolator $38_1$, but more than one disc spring 60 and/or other arrangements are optional. The disc spring 60 is partially compressed when the bolt 26 is fully compressed against the compression limiter 52. The compression in the disc spring 60 ensures that the elastomer layers 42 do not lose their compression preloading as the material succumbs to compression set over time. The disc spring(s) 60 can have a relatively low stiffness with just enough preload to overcome combustion forces and inertial forces during engine operation, and not the tightening torque of the bolt 26.

Figure 2:
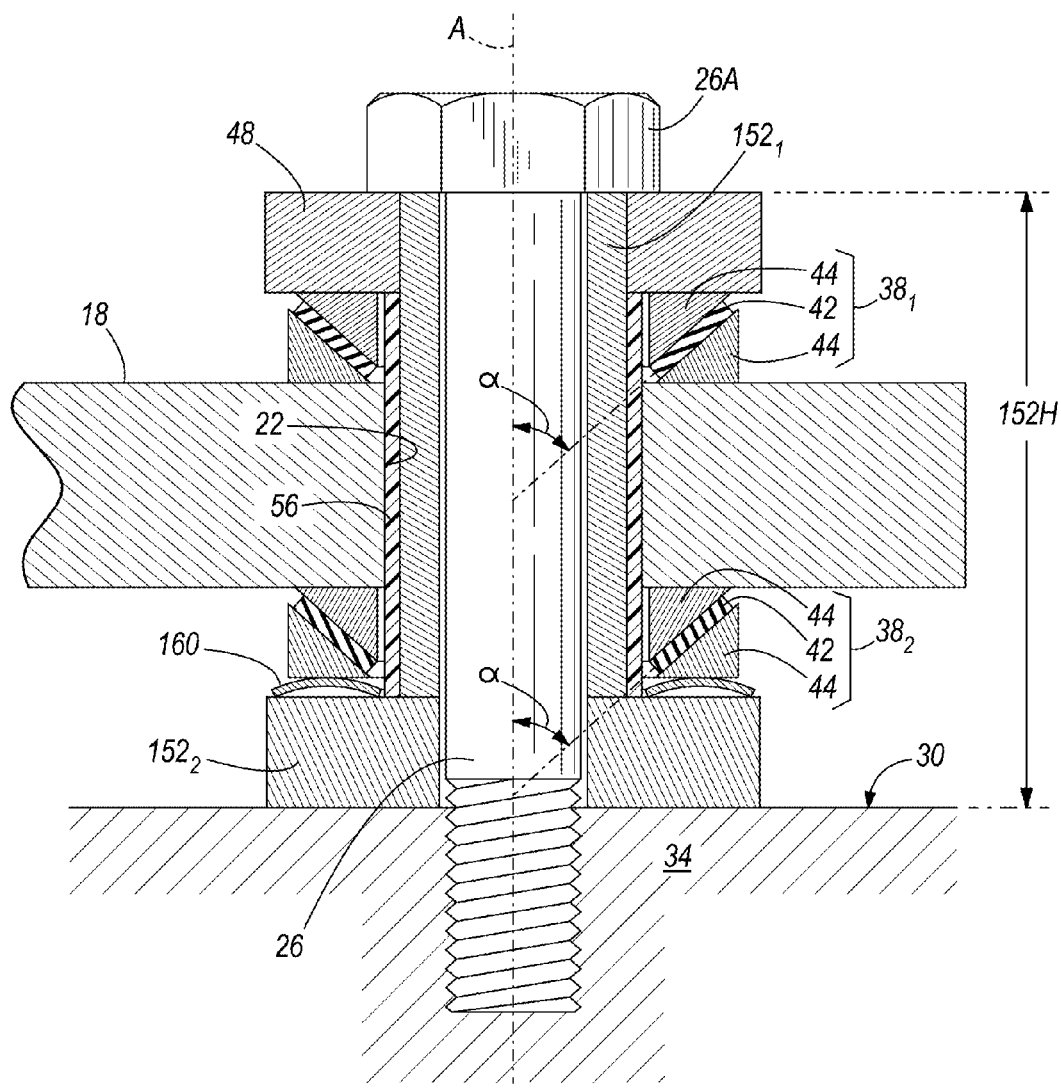
FIG. 2 is a cross-sectional view of a second construction of a vibration isolation fuel rail mounting arrangement, or mount.

FIG. 2 illustrates an alternate mounting arrangement for the fuel rail 10 relative to a support surface 30. Except as otherwise noted, the above description of FIG. 1 applies equally to the construction of FIG. 2, and like reference numbers are used where applicable. Contrary to the fuel rail mounting arrangement of FIG. 1, the fuel rail mounting arrangement of FIG. 2 includes a multi-piece compression limiter 152, which includes separately-formed sleeve $152_1$ and shoe $152_2$ portions. The combined height 152H of the sleeve $152_1$ and shoe $152_2$ portions is configured to provide the same compression-limiting performance as the height 52H of the compression limiter 52 of FIG. 1 by allowing only a predetermined amount of axial compression applied by the bolt 26 to reach the stacked-layer isolators 38.

Like the arrangement of FIG. 1, the arrangement of FIG. 2 includes at least one axial spring (e.g., a disc spring 160). However, the disc spring 160 of FIG. 2 is positioned adjacent the second stacked-layer isolator $38_2$, between the support surface 30 and the fuel rail mounting boss 18 (e.g., between the stacked-layer isolator $38_1$ and the shoe portion $152_2$ of the compression limiter 152). In this position, the disc spring 160 can have a reduced stiffness compared to the disc spring 60 of FIG. 1 since the disc spring 160 need only overcome inertial forces and not combustion forces. Combustion forces are resisted by only the first stacked-layer isolator $38_1$ adjacent the head end 26A of the bolt 26. The disc spring 160, like the disc spring 60 of FIG. 1, also maintains preload in the elastomer layers 42 to counteract compression set over time. Although illustrated separately, it should also be noted that the disc springs 60, 160 can be used together in a single mount.

The elastomer layer 42 of each stacked-layer isolator 38 includes two opposed contact surfaces $42_1$, $42_2$. In some constructions, each elastomer layer 42 is generally flat prior to assembly. For example, the elastomer layers 42 can be constructed of an annular layer or a sheet. Each of the contact surfaces $42_1$, $42_2$ contacts an adjacent contact surface $44_1$, $44_2$ of the corresponding ring 44. Each elastomer layer 42 can be elastically-deformed when compressed between the contact surfaces $44_1$, $44_2$ of the adjacent rings 44 to conform to the conical-tapered shape of the contact surfaces $44_1$, $44_2$ (although pre-forming the elastomer layers 42 to have a conical-tapered shape is optional). Each elastomer layer 42 may optionally be adhesively bonded to the adjacent contact surfaces $44_1$, $44_2$. The pairs of opposing contact surfaces $42_1$, $42_2$ of the elastomer layers 42 and the contact surfaces $44_1$, $44_2$ of the pairs of rings 44 are oriented oblique to the central axis A. In other words, the surfaces $42_1$, $42_2$, $44_1$, $44_2$ are inclined relative to the central axis A, and an angle α greater than zero degrees and less than 90 degrees is formed between the central axis A and each of the surfaces $42_1$, $42_2$, $44_1$, $44_2$. Although the two stacked-layer isolators 38 could alternately have surfaces $42_1$, $42_2$, $44_1$, $44_2$ oriented at two different angles, all of the surfaces $42_1$, $42_2$, $44_1$, $44_2$ of both stacked-layer isolators 38 are oriented at the same angle α relative to the central axis A in the illustrated construction. The angle α can be between about 30 degrees and about 60 degrees in some constructions. The angle α can be about 45 degrees in some constructions.

By orienting the surfaces $42_1$, $42_2$, $44_1$, $44_2$ to be oblique or inclined relative to the central axis A, vibrational forces oriented along the central axis A are damped primarily via shear between the elastomer layers 42 and the adjacent surfaces $44_1$, $44_2$ of the rings 44. If the surfaces $42_1$, $42_2$, $44_1$, $44_2$ were simply perpendicular to the central axis A, vibrational forces would be forced to be damped primarily by compression in the elastomer layers 42. Focusing the damping to occur through shear presents a more effective use of the stacked-layer isolators 38, which allows greater damping performance without any penalty in size or weight.

Figure 4:
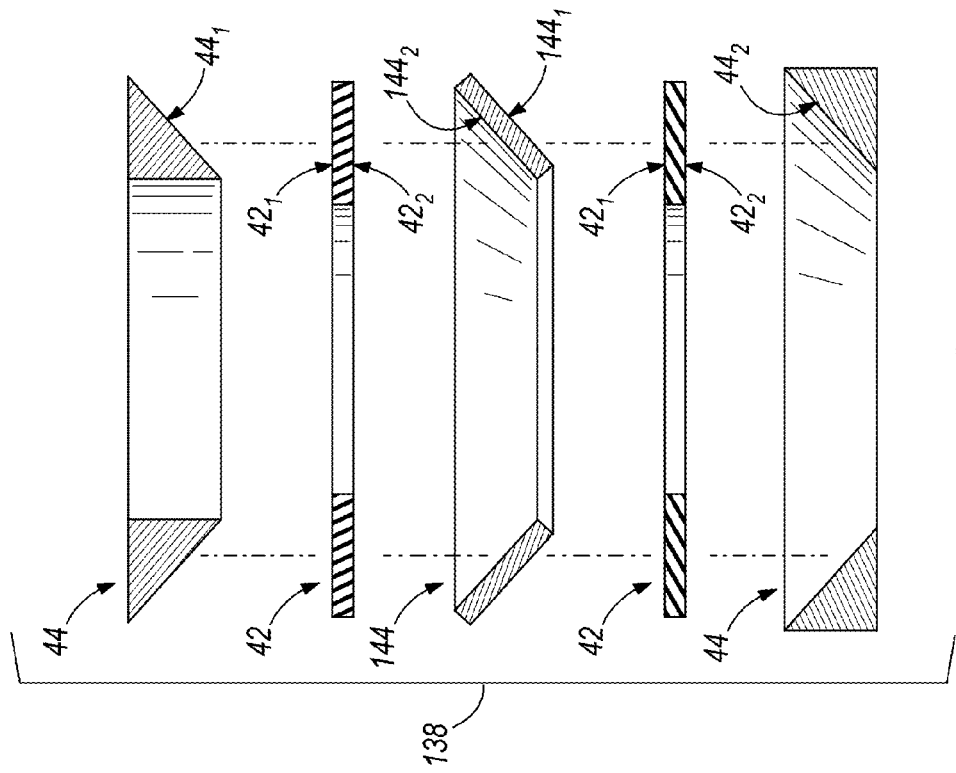
FIG. 4 is an exploded assembly view of an alternate multi-layer isolation member usable with the vibration isolation mounts of FIGS. 1 and 2.
Figure 3:
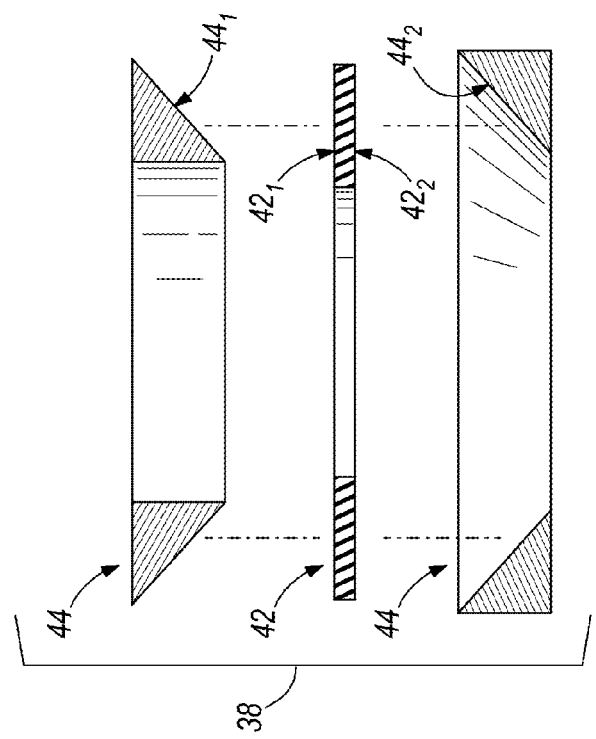
FIG. 3 is an exploded assembly view of a multi-layer isolation member shown in the vibration isolation mounts of FIGS. 1 and 2.

Although illustrated as a 3-layer assembly, each stacked-layer isolator 38 may include additional layers. For example, FIG. 4 illustrates a 5-layer isolator 138. Like the stacked-layer isolators 38, the stacked-layer isolator 138 of FIG. 4 includes two blocks or rings 44 at the opposing ends. However, the respective contact surfaces $44_1$, $44_2$ of the rings 44 contact the surfaces $42_1$, $42_2$ of two different elastomer layers 42, separated by an additional block or ring 144. The ring 144 between the two elastomer layers 42 includes opposing contact surfaces $144_1$, $144_2$ that contact the remaining contact surfaces $42_1$, $42_2$ of the two elastomer layers 42 (i.e., the contact surface of each elastomer layer 42 opposite that which contacts the outer ring $44_1$, $44_2$). Of course, other arrangements of stacked-layer isolators, including those with different-shaped layers and/or a different number of layers, are optional. It should also be appreciated that in some constructions, a stacked-layer isolator can include an elastomer layer sandwiched between a pair of parallel surfaces, oblique to the central axis A, that are provided by adjacent structures, such as at least one of the force-transmitting block 48, the mounting boss 18, the support surface 30, and the shoe portion 52₂, 152₂ of a compression limiter 52, 152, rather than the independent or standalone ring members 44, 144. In such cases, the "rings" of the stacked-layer isolators are the structure(s) adjacent the elastomer layers 42 that contact the elastomer layers.

Various features and advantages of the invention are set forth in the following claims.

What is claimed is:

1. A fuel rail mounting arrangement comprising:
   a fuel rail having a mounting portion;
   an aperture in the mounting portion of the fuel rail;
   a support surface;
   a fastener extending through the aperture along a central axis, the fastener having a first end and an opposed second end, the fastener configured to secure the fuel rail with respect to the support surface;
   a first stacked-layer isolator positioned on a first side of the mounting portion, compressed between the first end of the fastener and the mounting portion of the fuel rail by tightening of the fastener, the first stacked-layer isolator including a first pair of rings and a first elastomer layer positioned between the rings of the first pair, wherein the first elastomer layer has a pair of opposing contact surfaces respectively contacting adjacent contact surfaces of the first pair of rings, and wherein the pair of opposing contact surfaces of the first elastomer layer and the contact surfaces of the first pair of rings are oriented oblique to the central axis; and
   a second stacked-layer isolator positioned on a second side of the mounting portion, compressed between the mounting portion of the fuel rail and the support surface by tightening of the fastener, the second stacked-layer isolator including a second pair of rings and a second elastomer layer positioned between the rings of the second pair, wherein the second elastomer layer has a pair of opposing contact surfaces respectively contacting adjacent contact surfaces of the second pair of rings, and wherein the pair of opposing contact surfaces of the second elastomer layer and the contact surfaces of the second pair of rings are oriented oblique to the central axis.

2. The fuel rail mounting arrangement of claim 1, further comprising a compression limiter positioned between the first end of the fastener and the support surface and having an axial height configured to limit an amount of axial compression applied to the first and second elastomer layers to a predetermined maximum amount.

3. The fuel rail mounting arrangement of claim 2, wherein the compression limiter includes a sleeve positioned between the fastener and each of the first and second stacked-layer isolators, and the compression limiter being integrally-formed as one piece with a shoe for contacting the support surface, the shoe having a width transverse to the central axis that is greater than a width of the sleeve.

4. The fuel rail mounting arrangement of claim 2, further comprising at least one axial spring adjacent at least one of the first and second stacked-layer isolators, the at least one axial spring being at least partially compressed when the predetermined maximum amount of axial compression is applied to the first and second elastomer layers.

5. The fuel rail mounting arrangement of claim 4, wherein the at least one axial spring is positioned adjacent the second stacked-layer isolator, and no axial springs are positioned adjacent the first stacked-layer isolator.

6. The fuel rail mounting arrangement of claim 2, further comprising an elastomeric sleeve positioned between an outer radial surface of the compression limiter and respective inner radial surfaces of the first and second stacked-layer isolators.

7. The fuel rail mounting arrangement of claim 1, wherein the first and second elastomer layers are comprised of a thermoset elastomer.

8. The fuel rail mounting arrangement of claim 1, wherein the pair of opposing contact surfaces of the first elastomer layer, the contact surfaces of the first pair of rings, the pair of opposing contact surfaces of the second elastomer layer, and the contact surfaces of the second pair of rings are all oriented at substantially equal oblique angles relative to the central axis.

9. The fuel rail mounting arrangement of claim 8, wherein the angle is between about 30 degrees and about 60 degrees.

10. The fuel rail mounting arrangement of claim 9, wherein the angle is about 45 degrees.

11. The fuel rail mounting arrangement of claim 1, wherein the opposing contact surfaces of the first and second elastomer layers are bonded to the respective adjacent contact surfaces of the corresponding pair of rings.

12. The fuel rail mounting arrangement of claim 1, wherein each of the first and second stacked-layer isolators includes at least three rings and at least two elastomer layers interposed among the at least three rings.

\* \* \* \* \*